United States Patent
Gallagher et al.

(10) Patent No.: US 10,913,604 B2
(45) Date of Patent: Feb. 9, 2021

(54) SYSTEM AND METHOD FOR QUEUING ROBOTS DESTINED FOR ONE OR MORE PROCESSING STATIONS

(71) Applicant: Locus Robotics Corp., Wilmington, MA (US)

(72) Inventors: Kaitlin Margaret Gallagher, Lawrence, MA (US); Sean Johnson, Danvers, MA (US); Michael Charles Johnson, Ashland, MA (US); Luis Jaquez, Burlington, MA (US)

( * ) Notice: Subject to any disclaimer, the term of this patent is extended or adjusted under 35 U.S.C. 154(b) by 138 days.

(21) Appl. No.: 15/972,569

(22) Filed: May 7, 2018

(65) Prior Publication Data

US 2018/0370728 A1    Dec. 27, 2018

Related U.S. Application Data

(63) Continuation-in-part of application No. 15/628,751, filed on Jun. 21, 2017, now abandoned, and a
(Continued)

(51) Int. Cl.
*B65G 1/137*   (2006.01)
*B65G 1/04*    (2006.01)
(Continued)

(52) U.S. Cl.
CPC ............ *B65G 1/1373* (2013.01); *B25J 5/007* (2013.01); *B25J 9/0084* (2013.01); *B25J 9/1666* (2013.01);
(Continued)

(58) Field of Classification Search
CPC ...... G05D 1/0291; B65G 1/1373; B66F 9/063
See application file for complete search history.

(56) References Cited

U.S. PATENT DOCUMENTS

| | | | |
|---|---|---|---|
| 3,703,621 A | 11/1972 | Viola et al. | |
| 5,031,109 A | 7/1991 | Gloton | |

(Continued)

FOREIGN PATENT DOCUMENTS

| | | |
|---|---|---|
| CN | 1924910 A | 3/2007 |
| CN | 101956564 A | 1/2011 |

(Continued)

OTHER PUBLICATIONS

International Search Report with Written Opinion, dated Aug. 29, 2018, received in international patent application No. PCT/US2018/038674, 10 pages.

(Continued)

*Primary Examiner* — Thomas Randazzo
(74) *Attorney, Agent, or Firm* — Verrill Dana, LLP; John W. Powell

(57) ABSTRACT

A method for queuing robots destined for one or more processing stations in an environment includes determining when each robot of a plurality of robots destined for the one or more processing stations have entered a predefined target zone proximate the one or more processing stations. The method also includes assigning each of the robots to one of a plurality of queue positions based on an assigned priority and directing each of the robots from its assigned queue position to a processing position of one of the processing stations. Each of the processing stations includes at least two processing positions for a like number of robots to occupy for processing by an operator.

30 Claims, 17 Drawing Sheets

Related U.S. Application Data continuation-in-part of application No. 15/697,759, filed on Sep. 7, 2017, now Pat. No. 10,513,033.

(51) Int. Cl.

| | |
|---|---|
| *G06Q 10/08* | (2012.01) |
| *B25J 9/00* | (2006.01) |
| *B25J 9/16* | (2006.01) |
| *G06Q 10/00* | (2012.01) |
| *G05D 1/02* | (2020.01) |
| *B66F 9/06* | (2006.01) |
| *B25J 5/00* | (2006.01) |

(52) U.S. Cl.
CPC ............ *B65G 1/0492* (2013.01); *B66F 9/063* (2013.01); *G05D 1/0234* (2013.01); *G05D 1/0274* (2013.01); *G05D 1/0291* (2013.01); *G05D 1/0297* (2013.01); *G06Q 10/00* (2013.01); *G06Q 10/087* (2013.01); *G05D 2201/0216* (2013.01); *Y10S 901/01* (2013.01); *Y10S 901/08* (2013.01)

(56) References Cited

U.S. PATENT DOCUMENTS

| | | | |
|---|---|---|---|
| 6,389,329 | B1 | 5/2002 | Colens |
| 6,526,373 | B1 | 2/2003 | Barral |
| 6,764,373 | B1 | 7/2004 | Osawa et al. |
| 7,430,462 | B2 | 9/2008 | Chiu et al. |
| 7,708,578 | B1 | 5/2010 | Lenox |
| 7,729,801 | B2 | 6/2010 | Abramson |
| 8,010,229 | B2 | 8/2011 | Kim et al. |
| 8,352,114 | B2 | 1/2013 | More et al. |
| 8,390,251 | B2 | 3/2013 | Cohen et al. |
| 8,439,698 | B1 | 5/2013 | Saini et al. |
| 8,452,450 | B2 | 5/2013 | Dooley et al. |
| 8,461,803 | B2 | 6/2013 | Cohen |
| 8,476,867 | B2 | 7/2013 | Li et al. |
| 8,854,001 | B2 | 10/2014 | Cohen et al. |
| D721,650 | S | 1/2015 | Fauchet et al. |
| 8,983,647 | B1* | 3/2015 | Dwarakanath ....... G05D 1/0217 700/216 |
| 9,008,827 | B1* | 4/2015 | Dwarakanath ........ A47F 3/0482 700/216 |
| 9,178,370 | B2 | 11/2015 | Henricksen et al. |
| 9,203,184 | B1 | 12/2015 | Hui |
| 9,229,454 | B1 | 6/2016 | Chiappetta et al. |
| 9,463,927 | B1 | 10/2016 | Theobald |
| 9,519,882 | B2 | 12/2016 | Galluzzo et al. |
| 9,776,324 | B1 | 10/2017 | Johnson |
| 10,022,867 | B2 | 7/2018 | Saboo |
| 2005/0113972 | A1 | 5/2005 | Kumhyr |
| 2006/0265103 | A1* | 11/2006 | Orita .................... G05D 1/0278 700/245 |
| 2007/0021864 | A1* | 1/2007 | Mountz ................ G06Q 10/087 700/216 |
| 2008/0109114 | A1* | 5/2008 | Orita ..................... H02J 7/0027 700/248 |
| 2008/0167884 | A1* | 7/2008 | Mountz .............. G06Q 10/0875 705/29 |
| 2010/0286823 | A1 | 11/2010 | Norio |
| 2010/0296908 | A1 | 11/2010 | Ko |
| 2011/0000008 | A1 | 1/2011 | Yamashita |
| 2011/0200420 | A1 | 8/2011 | Driskill et al. |
| 2012/0049798 | A1 | 3/2012 | Cohen et al. |
| 2012/0152877 | A1 | 6/2012 | Tadayon |
| 2012/0330458 | A1 | 12/2012 | Weiss |
| 2013/0317642 | A1 | 11/2013 | Asaria et al. |
| 2014/0100998 | A1* | 4/2014 | Mountz .................. G06Q 10/08 705/28 |
| 2014/0277691 | A1 | 9/2014 | Jacobus et al. |
| 2014/0360832 | A1 | 12/2014 | Aldrich |
| 2015/0367513 | A1 | 12/2015 | Gettings |
| 2016/0031644 | A1* | 2/2016 | Schubilske ............ G05B 15/02 700/216 |
| 2016/0075021 | A1 | 3/2016 | Cohen et al. |
| 2016/0129592 | A1* | 5/2016 | Saboo .................. G05D 1/0297 700/248 |
| 2017/0072564 | A1 | 3/2017 | Cohen et al. |
| 2017/0158430 | A1* | 6/2017 | Raizer ................... B65G 1/137 |
| 2018/0039282 | A1* | 2/2018 | Gupta .................. G05D 1/0223 |
| 2018/0043533 | A1 | 2/2018 | Johnson et al. |

FOREIGN PATENT DOCUMENTS

| | | |
|---|---|---|
| CN | 102915465 A | 2/2013 |
| CN | 103217979 A | 7/2013 |
| CN | 1049500684 | 9/2015 |
| CN | 102016893 A | 4/2018 |
| EP | 1632319 A1 | 3/2006 |
| EP | 2617531 A1 | 7/2013 |
| JP | 57204911 A | 12/1982 |
| JP | H09-508740 A | 9/1997 |
| JP | P2000-250627 A | 9/2000 |
| JP | 2006231448 A | 9/2006 |
| JP | 2007-257195 A | 10/2007 |
| WO | 2007149227 A2 | 12/2007 |

OTHER PUBLICATIONS

International Search Report with Written Opinion, dated Aug. 29, 2018, received in international patent application No. PCT/US2018/038695,11 pages.

Office Action issued by the Japanese Patent Office dated Jul. 1, 2020 in Japanese Patent Application No. 2018-550338, entitled "Robot and Method for Queueing Robot for Order-Fulfillment Operations."

International Search Report with Written Opinion, dated Jun. 30, 2017, received in international patent application No. PCT/US17/24194, 12 pages.

* cited by examiner

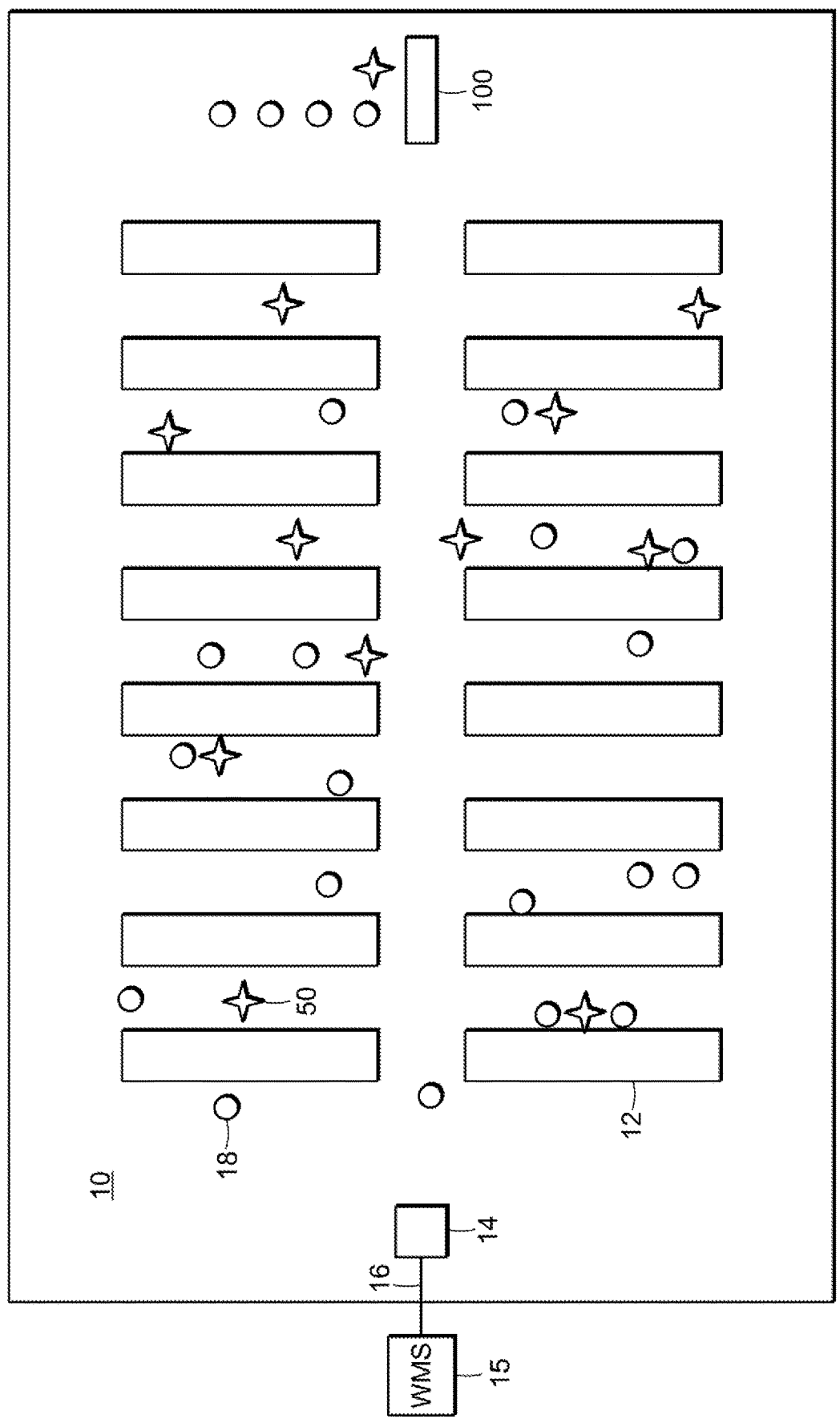

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

SYSTEM AND METHOD FOR QUEUING ROBOTS DESTINED FOR ONE OR MORE PROCESSING STATIONS

CROSS-REFERENCE TO RELATED APPLICATIONS

This application is a continuation-in-part application of U.S. application Ser. No. 15/628,751 filed on Jun. 21, 2017, and U.S. application Ser. No. 15/697,759 filed on Sep. 7, 2017, the contents of both are incorporated herein by reference in their entirety.

FIELD OF THE INVENTION

This invention relates to a system and method for queueing robots destined for processing stations and more particularly to directing each robot from a queue to one of a plurality of processing positions at each processing station.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

With numerous robots navigating a warehouse space it is very possible and even likely that robots will attempt to navigate to a position that is occupied by another robot, resulting in a race condition. Race conditions are when two robots are attempting to get to the same place and become processor bound as they attempt to reconcile the changing external environment. Race conditions are very undesirable and can result the robots being unable to perform further operations until the condition is resolved.

Another aspect of autonomous robot solutions in warehouse order fulfillment operations that can result in inefficiencies is the process of assigning orders to robots and in the process of removing orders from robots for packing and shipping to customers. This is typically done with the assistance of a human operator. The process of assigning orders is referred to as an "induction" process and may include assigning to a robot one or more "pick" orders (items to be picked for shipping to a customer) or it may include assigning one or more "place" orders (items to be placed into inventory in the appropriate location in the warehouse). The process of removing orders from robots which have been picked so that items can be packed by an operator and shipped to customers is called "packing". In a warehouse there may be a number of induction stations and a number of packing stations to which the robots can travel to be assigned orders or to deliver completed orders to be packed and shipped.

With many robots operating in a warehouse, coordinating a smooth an efficient process for access to common induction and packing stations while avoiding race conditions between robots is a complex task. However, processing robots at induction and packing stations effectively and efficiently is a critical part of ensuring high throughput of orders in the warehouse operation. Therefore, there exists a need for improving the efficiency and effectiveness of processing robots (induction and packing) to increase throughput.

BRIEF SUMMARY OF THE INVENTION

It is therefore an object of the invention to provide a smooth an efficient process for robots to access common induction and packing stations.

It is a further an object of the invention to provide such a process which avoids race conditions between robots while accessing common induction and packing stations.

It is a further an object of the invention to decreases processing time at induction/packing stations and hence waiting time for robots to increase throughput of the warehouse operation.

In one aspect the invention features a method for queuing robots destined for one or more processing stations in an environment. The method includes determining when each robot of a plurality of robots destined for the one or more processing stations has entered a predefined target zone proximate the one or more processing stations and assigning each of the robots to one of a plurality of queue positions based on an assigned priority. The method also includes directing each of the robots from its assigned queue position to a processing position of one of the processing stations, wherein each of the processing stations includes at least two processing positions for a like number of robots to occupy for processing by an operator.

In other aspects of the invention one or more of the following features may be included. The environment may be a warehouse space containing items for customer order fulfillment. The assigned priority may be determined by the order of entry of each of the plurality of robots into the target zone, and the first robot to enter the target zone may be assigned the highest priority. The assigned priority may be determined by one or both of the order of entry of each of the plurality of robots into the target zone and an order priority associated with a customer order to be processed by each of the plurality of robots. The order priority associated with the customer order to be processed by each of the plurality of robots may be determined by one or more of the following: shipping priority, item type, customer type, or retailer. The plurality of queue positions may include at least two queue groups spaced from each other in the environment. The method may include a first plurality of queue positions in a first queue group and a second plurality of queue positions in a second queue group, wherein the first plurality of queue positions in the first queue group and the second plurality of queue positions in a second queue group are all associated with one processing station. The plurality of queue positions may be grouped into one queue group and the plurality of queue positions are associated with a plurality of processing stations. The first plurality of queue positions in the first queue group and the second plurality of queue positions in the second queue group may be associated with a plurality of processing stations. The at least two processing positions of the one or more processing stations and the plurality of queue positions may each defined by a pose to which the robot is capable of navigating.

In further aspects of the invention one or more of the following features may be included. The one processing station may include a first processing position and a second processing position. Robots from the first queue group may be directed to the first processing position and robots from the second queue group may be directed to the second processing position. Robots which have entered the target zone destined for the one processing station may each be assigned a priority and are directed to one of the first queue group or the second queue group in an alternating manner based on priority starting with the highest priority robot being assigned to the first queue group. Robots from the first queue group may be directed to the first processing position in sequence based on priority and robots from the second queue group may be directed to the second processing position in sequence based on priority. The one or more processing stations may each be configured for one of (a) induct robots, (b) unloading robots, and (c) both inducting and unloading robots. Robots from the one queue group may be directed in priority order to a next available processing position from any of the plurality of processing stations. Robots from the first and second queue groups may be directed in priority order to a next available processing position from any of the plurality of processing stations.

In yet another aspect, the invention features a system for queuing robots destined for at least one processing station in an environment. The system includes a plurality of robots and at least one processing station configured for processing the plurality of robots. Each of the at least one processing station includes at least two processing positions for a like number of robots to occupy for processing by an operator. There is a management system in communication with the plurality of robots and the at least one processing station. The management system is configured to determine when each robot of a plurality of robots destined for the at least one processing station has entered a predefined target zone proximate the at least one processing station. The management system is also configured to assign each of the robots to one of a plurality of queue positions based on an assigned priority and to direct each of the robots from its assigned queue position to a processing position of one of the at least one processing stations.

In other aspects of the invention one or more of the following features may be included. The environment may be a warehouse space containing items for customer order fulfillment. The assigned priority may be determined by the order of entry of each of the plurality of robots into the target zone, and the first robot to enter the target zone may be assigned the highest priority. The assigned priority may be determined by one or both of the order of entry of each of the plurality of robots into the target zone and an order priority associated with a customer order to be processed by each of the plurality of robots. The order priority associated with the customer order to be processed by each of the plurality of robots may be determined by one or more of the following: shipping priority, item type, customer type, or retailer. The plurality of queue positions may include at least two queue groups spaced from each other in the environment. The method may include a first plurality of queue positions in a first queue group and a second plurality of queue positions in a second queue group, wherein the first plurality of queue positions in the first queue group and the second plurality of queue positions in a second queue group may be all associated with one processing station. The plurality of queue positions may be grouped into one queue group and the plurality of queue positions may be associated with a plurality of processing stations. The first plurality of queue positions in the first queue group and the second plurality of queue positions in the second queue group may be associated with a plurality of processing stations.

In yet further aspects of the invention one or more of the following features may be included. The at least two processing positions of the one or more processing stations and the plurality of queue positions may each be defined by a pose to which the robot is capable of navigating. The one processing station may include a first processing position and a second processing position. Robots from the first queue group may be directed to the first processing position and robots from the second queue group may be directed to the second processing position. Robots which have entered the target zone destined for the one processing station may be each assigned a priority and may be directed to one of the first queue group or the second queue group in an alternating manner based on priority starting with the highest priority robot being assigned to the first queue group. Robots from the first queue group may be directed to the first processing position in sequence based on priority and robots from the second queue group may be directed to the second processing position in sequence based on priority. The one or more processing stations may each be configured for one of (a) induction, (b) packing, and (c) both induction and packing. Robots from the one queue group may be directed in priority order to a next available processing position from any of the plurality of processing stations. Robots from the first and second queue groups may be directed in priority order to a to a next available processing position from any of the plurality of processing stations.

These and other features of the invention will be apparent from the following detailed description and the accompanying figures, in which:

BRIEF DESCRIPTION OF THE FIGURES

FIG. 1 is a top plan view of an order-fulfillment warehouse;

FIG. 6 is a table of the fiducial identification to pose mapping;

FIG. 7 is a table of the bin location to fiducial identification mapping;

DETAILED DESCRIPTION OF INVENTION

Figure 2A:
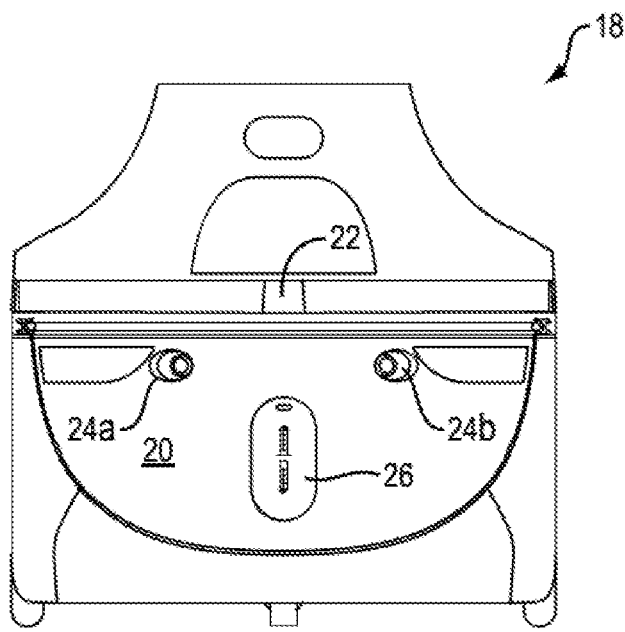
FIG. 2A is a front elevational view of a base of one of the robots used in the warehouse shown in FIG. 1.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to a system and method for queueing robots destined for a common processing station. Although not restricted to any particular robot application, one suitable application that the invention may be used in is order fulfillment. The use of robots in this application will be described to provide context for the system and method for queueing robots but is not limited to that application. Moreover, a specific autonomous mobile robot ("AMR") implementation is described herein, but it is only to provide context for the induction process according to this invention. Any applicable robot design/system may be used in conjunction with the induction process described herein.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2B:
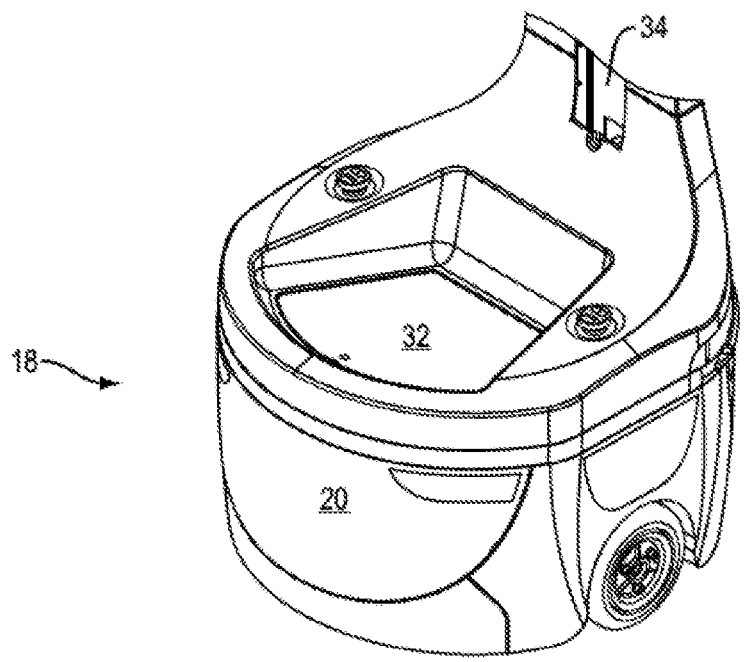
FIG. 2B is a perspective view of a base of one of the robots used in the warehouse shown in FIG. 1.
Figure 3:
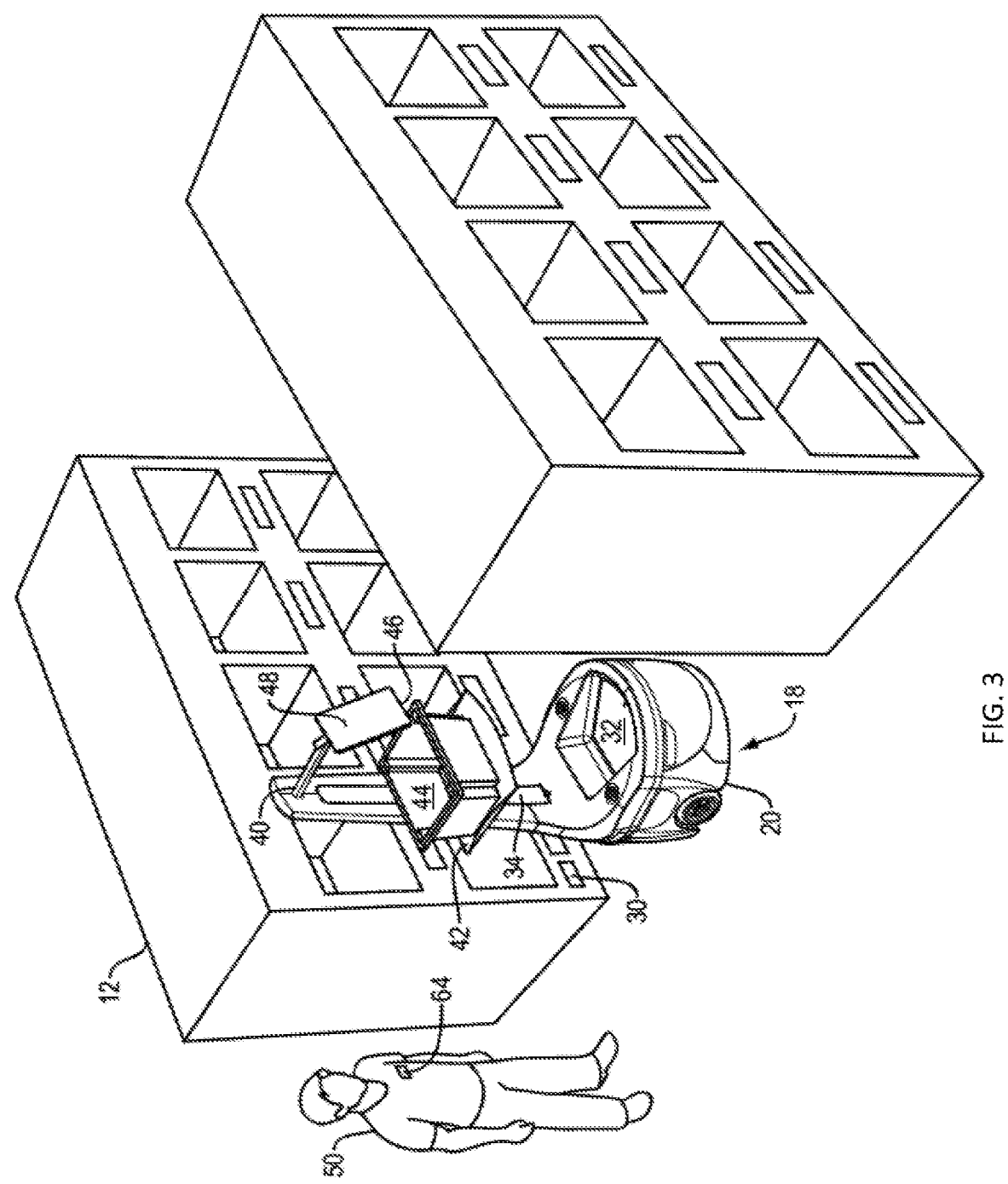
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
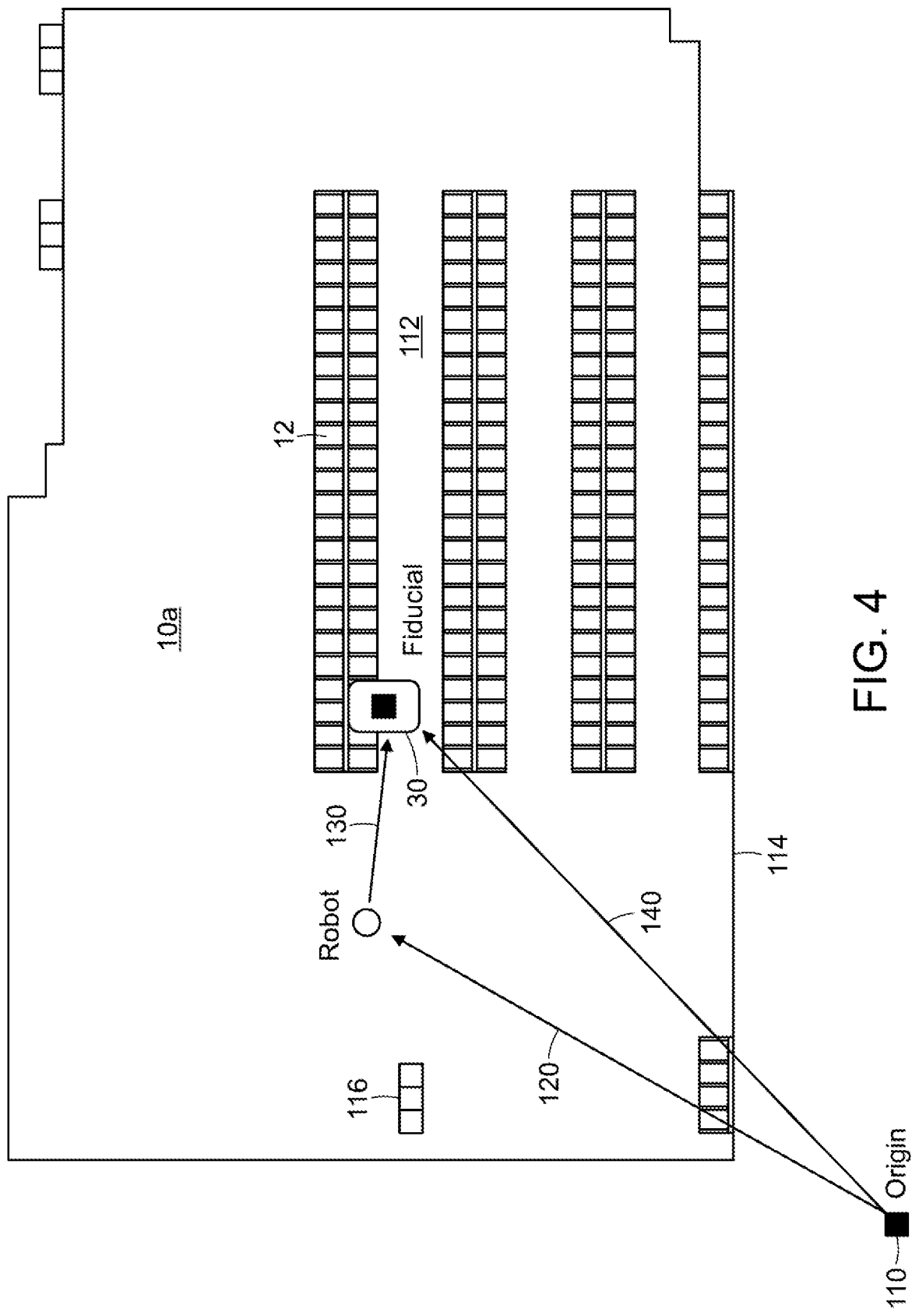
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
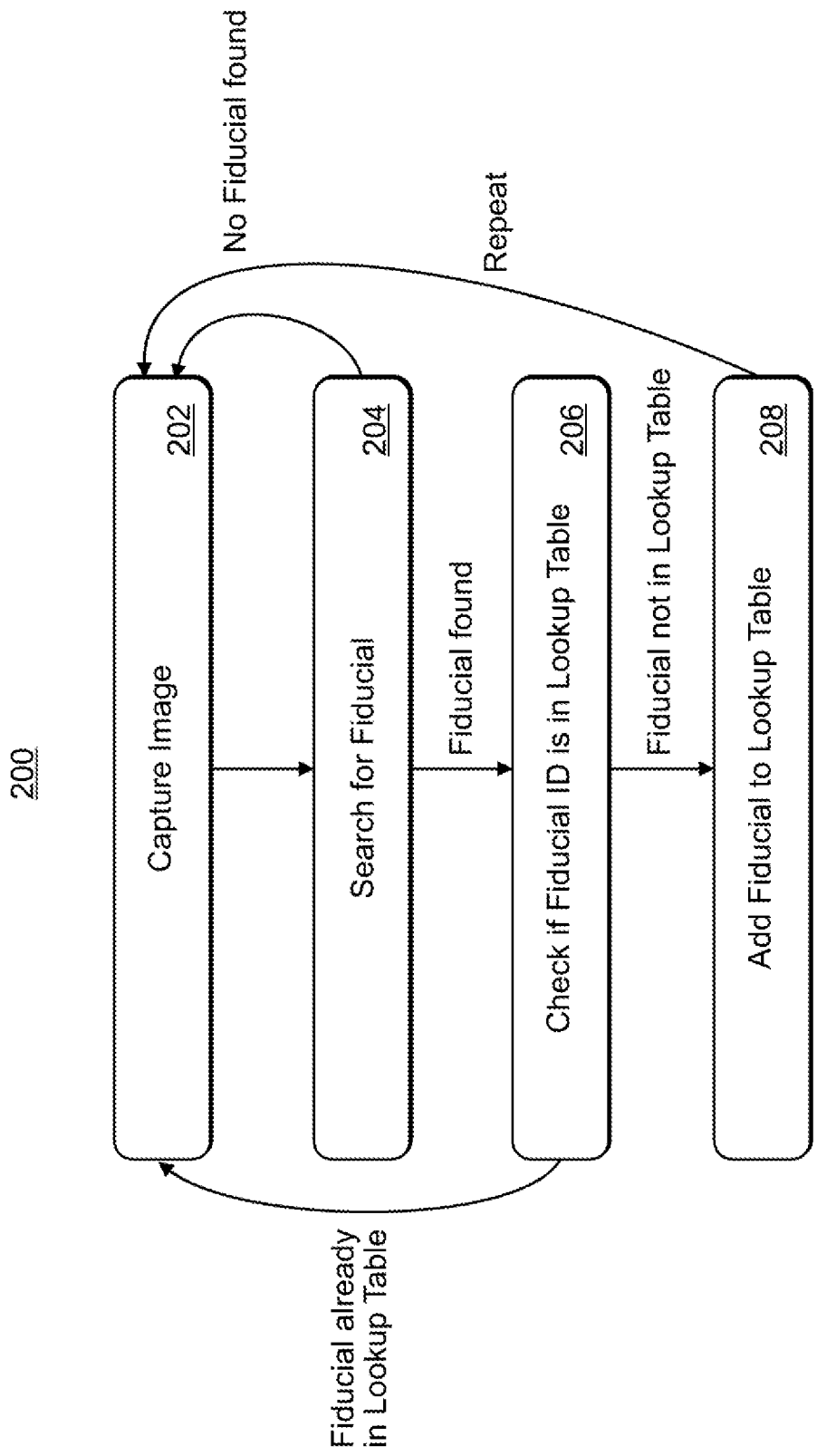
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
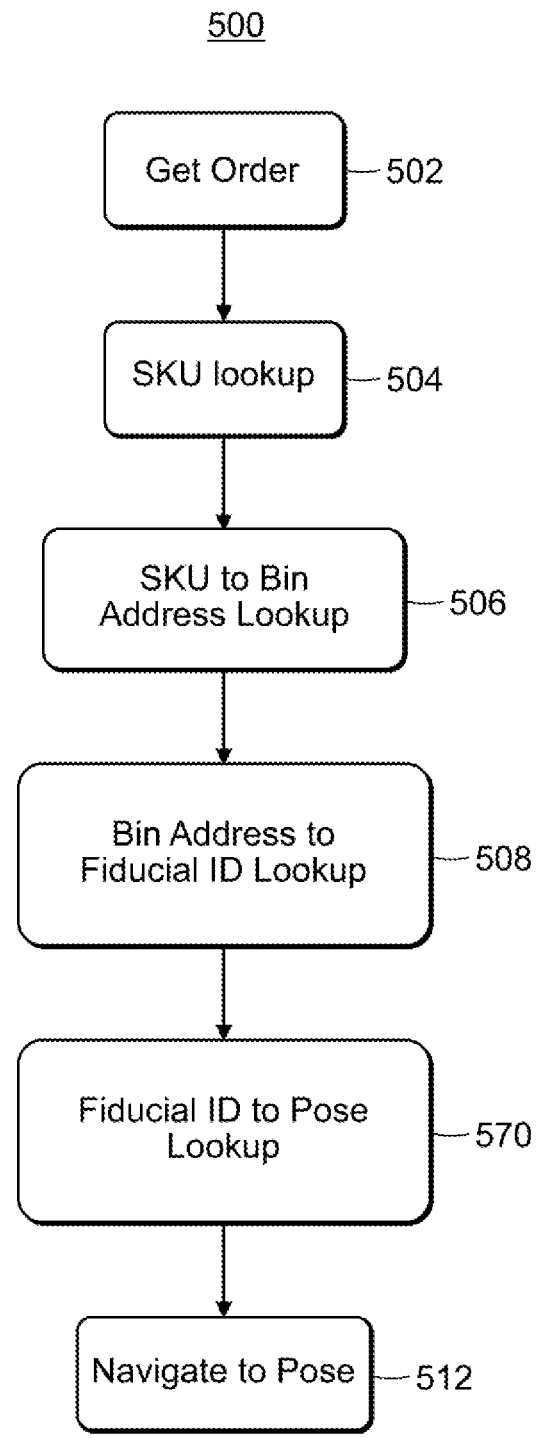
FIG. 8 is a flow chart depicting product SKU to pose mapping process.

The order fulfillment process according to this invention is depicted in flow chart 500, FIG. 8. In step 502, from warehouse management system 15, FIG. 1, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10*a* is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3SRM search space according to methods disclosed in related U.S. application Ser. No. 15/712,222, entitled Multi-Resolution Scan Matching with Exclusion Zones, filed on Sep. 22, 2017 and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/712,256, entitled Dynamic Window Approach Using Optimal Reciprocal Collision Avoidance Cost-Critic, filed on Sep. 22, 2017 and incorporated by reference in its entirety herein.

Figure 9:
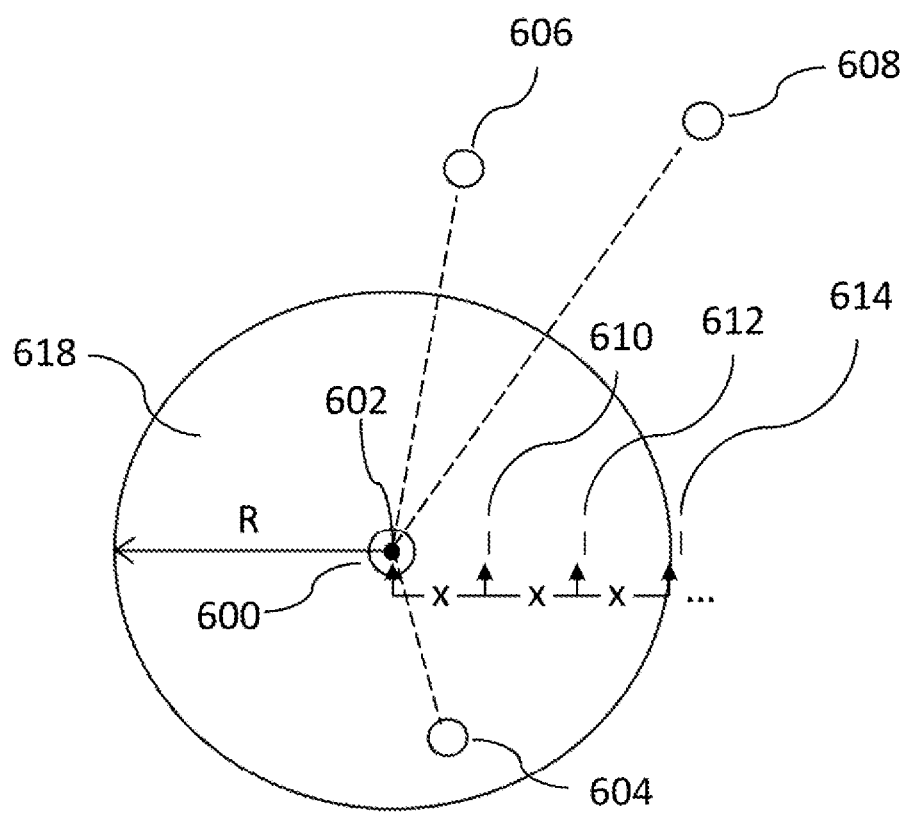
FIG. 9 is a schematic view of the target and queue locations used in the queuing process according to an aspect of this invention.

As described above, a problem that can arise with multiple robots navigating a space is called a "race condition", which can occur if one or more robots attempt to navigate to a space occupied by another robot. With this invention, alternative destinations for the robots are created to place them in a queue and avoid race conditions from occurring. The process is depicted in FIG. 9, where robot 600 is shown positioned at a target location/pose 602. Pose 602 could correspond to any location in a warehouse space, for example, a packing station or a position near a particular bin. When other robots try to navigate to pose 602, such as robots 604, 606, and 608 (as indicated by the dotted lines from the robots and terminating at pose 602) they are redirected to temporary holding locations, such as locations or queue slots 610, 612, and 614.

Queue slots or locations 610, 612, and 614 are offset from pose 612. In this example queue slot 610 is offset from pose 602 by a distance x, which could be, for example, one (1) meter. Queue slot 612 is offset from queue slot 610 by an additional distance x and queue slot 614 is offset another distance x from queue slot 612. While, in this example, the distances are uniformly spaced along a straight line emanating from pose 602, this is not a requirement of the invention. The locations of the queue slots may be non-uniform and variable given the dynamic environment of the warehouse. The queue slots maybe offset according to a queuing algorithm that observes the underlying global map and the existing obstacles and constraints of the local map. The queuing algorithm may also consider the practical limits of queuing in the space proximate the target location/pose to avoid blocking traffic, interfering with other locations, and creating new obstacles.

In addition, the proper queue slotting of robots into the queue must be managed. In the example shown in FIG. 9, the robot with the first priority to occupy the pose 602 is queued in the first queue slot 610, while the other robots are queued in the other queue slots based on their respective priorities. Priorities may be determined by the order of the robots' entry into a zone 618 proximate pose 602 or other criteria, such as, order priority or expedited delivery requirements (in the case of pick orders) or low inventory (in the case of place orders). In this case, zone 618 is defined by a radius, R, about pose 602, which in this case is approximately three (3)

meters (or 3×). The first robot to enter the zone, in this case 604, has the highest priority and is assigned the first queue slot, queue slot 610. When robot 606, which is closer to zone 618 than robot 608, enters zone 618, assuming that robot 600 is still at pose 602 and robot 604 is located at queue slot 610, it has the next highest priority and it is therefore assigned queue slot 612. When robot 608 then enters zone 618, assuming that robot 600 is still at pose 602 and robots 604 and 606 are still located at queue slots 610 and 612, respectively, it is assigned to queue slot 614.

When robot 600 moves from pose 602 (target location), robot 604 moves from queue slot 610 to pose 602. Robots 606 and 608 move to queue slot positions 610 and 612, respectively. The next robot to enter zone 618 would be positioned in queue slot position 614. Of course, additional number of queue slot positions could be included to accommodate expected traffic flows.

The manner in which the robots are navigated to the queue slots and ultimately the target location is accomplished by temporarily redirecting them from the pose of the target location to the pose(s) of the queue slot(s). In other words, when it is determined that a robot must be placed in a queue slot, its target pose is temporarily adjusted to a pose corresponding to the location of the queue slot to which it is assigned. As it moves up in position in the queue, the pose is again adjusted temporarily to the pose of the queue slot with the next highest priority until it is able to reach its original target location at which time the pose is reset to the original target pose.

Figure 10:
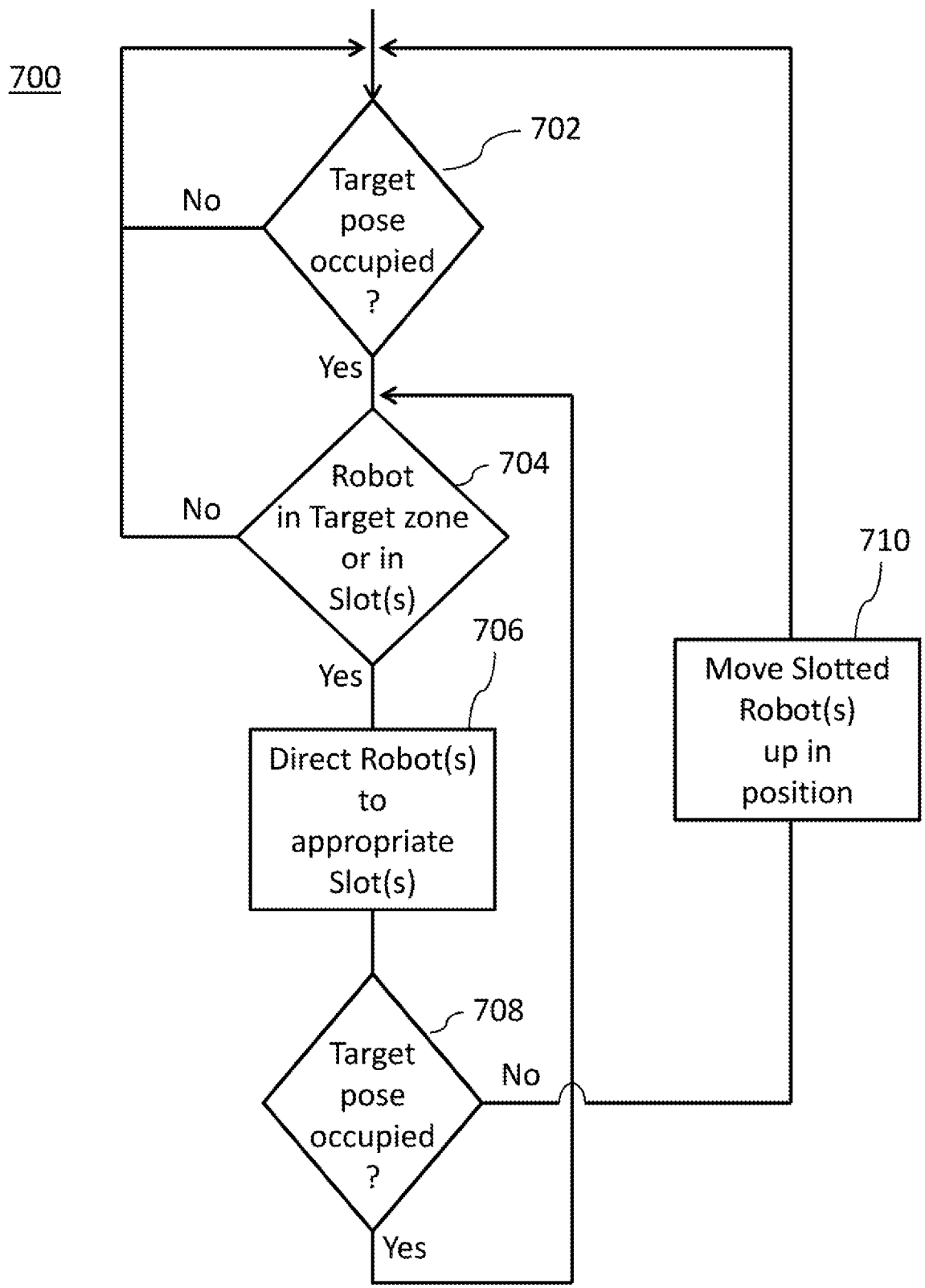
FIG. 10 is a flow chart depicting the robot queuing process according to an aspect of this invention.

Flow chart 700, FIG. 10, depicts the robot queuing process implemented by WMS 15 or order server 14, as the case may be, for a particular pose (target pose) within the warehouse. At step 702, it is determined if the target pose is occupied by a robot. If it is not, the process returns to step 702 until there is a robot occupying the target pose. When a robot is occupying the target pose, the process determines at step 704 if there is another robot in the target zone or if there is a robot in one or more of the queue slots. If it is determined that there is no robot in the target zone or in one or more queue slots, the process returns to step 702. If it is determined that there is a robot occupying the target pose or if the queue slot(s) is/are occupied, then at step 706 the robots are assigned to the appropriate queue slots.

If there is a robot in the target zone but no robot in the queue slots, then the robot in the target zone is directed to occupy the first queue slot, i.e. queue slot 610, FIG. 9. If there is a robot in the target zone and a robot (or multiple robots in the queue slots) then the robot in the target zone is slotted into the next available queue slot, as described above. If there is no robot in the target zone but there is/are robot(s) in the queue slot(s), then the slotted robots remain in the same positions. At step 708, if it is determined that the target pose is not occupied, then the robots in the queue slots are moved up a position, i.e. queue slot 610 to the target pose, queue slot 612 to queue slot 610 and so forth. If the target pose is still occupied, the process returns to step 704.

Figure 11:
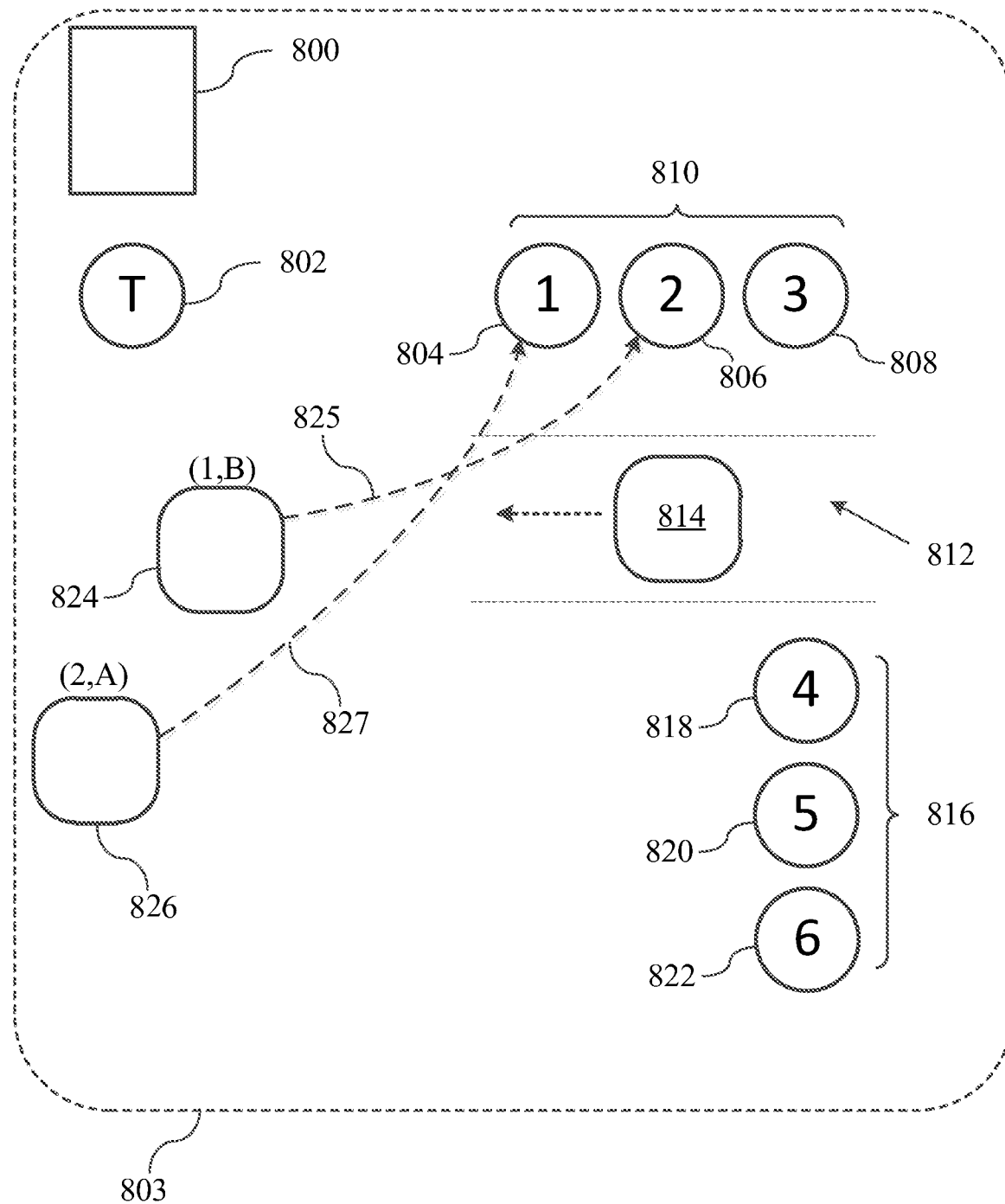
FIG. 11 is a schematic view of the target and queue locations according to another aspect of this invention with robots being directed to designated queue locations based on assigned priorities.

In FIG. 9, the queue locations 610, 612, and 614 are in line and adjacent to each other. This is acceptable for many situations, but in areas within a warehouse environment where there is limited space or heavy traffic or when many queue locations are needed, it may be desirable to utilize a "split" queue. An example of this is shown in FIG. 11. Here, a processing station 800 having a target location 802 is shown. Processing station 800 may be an induction station attended by an operator where a robot is assigned a customer order to fill and provided with a tote to carry the order or it may be a packing station where the robot is dropping off a customer order for packing and shipment by an operator. The target location does not need to be associated with a station, but it is a typical situation where multiple robots may be simultaneously vying for a common target location.

Referring again to FIG. 11, queue locations 804, 806 and 808 are part of a first queue group 810 and are shown spaced from target location 802. In this example, additional queue locations are required, but there is limited space as queue group 810 is adjacent to a busy path of traffic traversed by robots, such as robot 814, and operators. To overcome this issue, there is formed a second queue group 816, including additional queue locations 818, 820, and 822, physically spaced from queue group 810 across path 812. The queue locations in the two queue groups 810 and 816, even though physically separated, together form a single queue for target location 802. It should be noted that while there are two queue groups each with three queue locations, any number of queue groups having any number of queue locations may be used in accordance with the disclosure herein.

Just as with FIG. 9, in the example of in FIG. 11, assuming the target location 802 (labelled "T") is occupied by a robot being serviced at station 802, robots entering a predefined target zone 803, defined by a dashed-line, are assigned to queue locations based on priorities assigned to them by the system. Queue location 804, labelled "1", is the highest priority queue location. Queue locations 806-822 have lower/decreasing priority levels, as indicated by their labels "2"-"6". Thus, the robot with the first or highest priority to occupy the target location 802, when it is available, is directed to queue location 804, while the other robots are queued in the other queue slots based on their respective priorities. Priorities may be determined by the order of the robots' entry into the predefined target zone. In other words, the earlier the entry into the target zone, the higher the assigned priority for the robot and thus the lower the queue number.

The assigned priorities may be established in other ways. For example, instead of or in combination with the time of entering into the target zone, priority can be assigned based on the customer order of already picked items being carried by the robot to a packing station for unloading, packing and shipping. The customer order for each robot may be assigned a priority based on one or more of the following criteria: shipping priority, item type, customer type, or retailer, for example. Customer orders with expedited delivery or preferred customers may be assigned a high priority and therefore be placed in higher priority queue locations to ensure faster processing. Similarly, certain products or retailers could be given priority based on contractual relationships. The priority of the customer order alone or in combination with the priority based on the time of entering into the target zone may be used to assign priority and hence queue location to the robots vying for the common target location.

Continuing to refer to FIG. 11, there are shown two robots 824 and 826 which have entered the predefined target zone 803. Robot 824 has been assigned a priority of (1,B) and robot 826 has been assigned a priority of (2,A). In this example the first priority criteria is numerical and indicates the order in which the robots entered the target zone 803, i.e. robot 824 entered first and robot 826 entered second. If the order of entry was the only criteria, robot 824 would be assigned to queue location 804 and robot 826 would be assigned to queue location 806. However, in this example there is a second criteria related to the customer order, e.g. shipping priority, item type, customer type, or retailer. Robot 824 has been assigned a "B" priority regarding its customer order while robot 826 has been assigned an "A" priority. In this example, the customer order priority trumps the order of entry into the target zone so, as indicted by lines 825 and 827, robot 824 is directed to queue location 806 (location "2") and robot 826 is directed to queue location 804 (location "1").

This above example is just one simple example of priority assignment and any suitable method for assigning priority may be used in connection with this invention using the standard queue shown in FIG. 9, the split queue of FIG. 11 and the shared/split queues described below in FIGS. 12 and 13.

Figure 12:
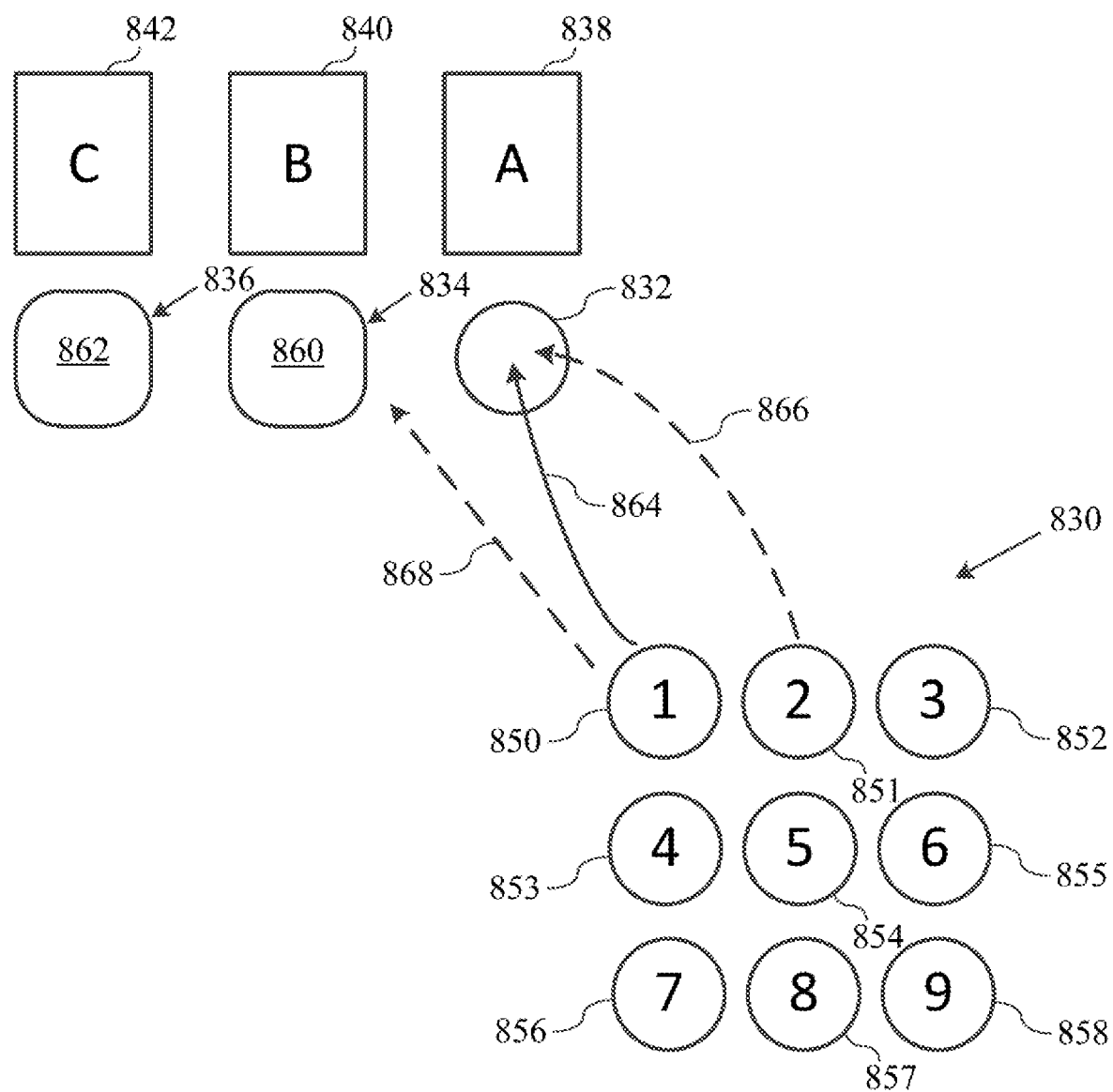
FIG. 12 is a schematic view of the target and queue locations in another aspect of queuing process according to this invention in which a shared queue is used.

In another embodiment, shown in FIG. 12, another aspect of the disclosure is described. Here, a "shared" queue 830 may be used. What is meant by "shared" in this context is that queue group 830 is shared among a number of target locations, such as target locations 832, 834, and 836, which are associated with and proximate to stations 838, 840, and 842, respectively. Robots that are destined for any of target locations 832, 834 or 836 are directed to one of the queue locations 850-858, which have priorities 1-9, respectively. This means that queue location 850 (priority "1") is the location where the robot with the highest priority would be located irrespective of the target location for which it is destined and queue location 9 (priority "9") is the queue location where the robot with the lowest priority would be directed.

Stations 838 ("A"), 840 ("B"), and 842 ("C"), may be configured to perform the same or different functions. For example, they may all be configured as induction stations or packing stations or they may be configured as a combination induction and packing stations. Moreover, any number of stations and any number of queue locations in queue group 830 may be used. In one scenario, stations 838, 840, and 842 may be configured such that any robot in the queue locations can proceed to any target location/station. In that case, as indicated by solid line 864, a robot positioned in queue location 850 would proceed to the first available target location which in this example is target location 832. Target locations 834 and 836 are shown to be occupied by robots 860 and 862, respectively. The robots in the other queue locations will all move up to the next highest priority queue location.

Alternatively, for various reasons, certain robots may only be able to proceed to certain stations/target locations. This scenario is depicted in FIG. 12 by the dashed line 866, which shows the robot in queue location 851 (priority "2") proceeding to open target location 832 instead of the robot in queue location 850 (priority "1"). This may be because the robot at queue location 850 is not able to be serviced by station 838 (e.g. the robot needs to be inducted but station 838 is dedicated to packaging/delivery). As shown by dashed line 868, when robot 860 leaves target location 834 (assuming that robot 860 leaves before robot 862), the robot at queue location 850 will proceed to target location 834 to be serviced by station 840.

Figure 13:
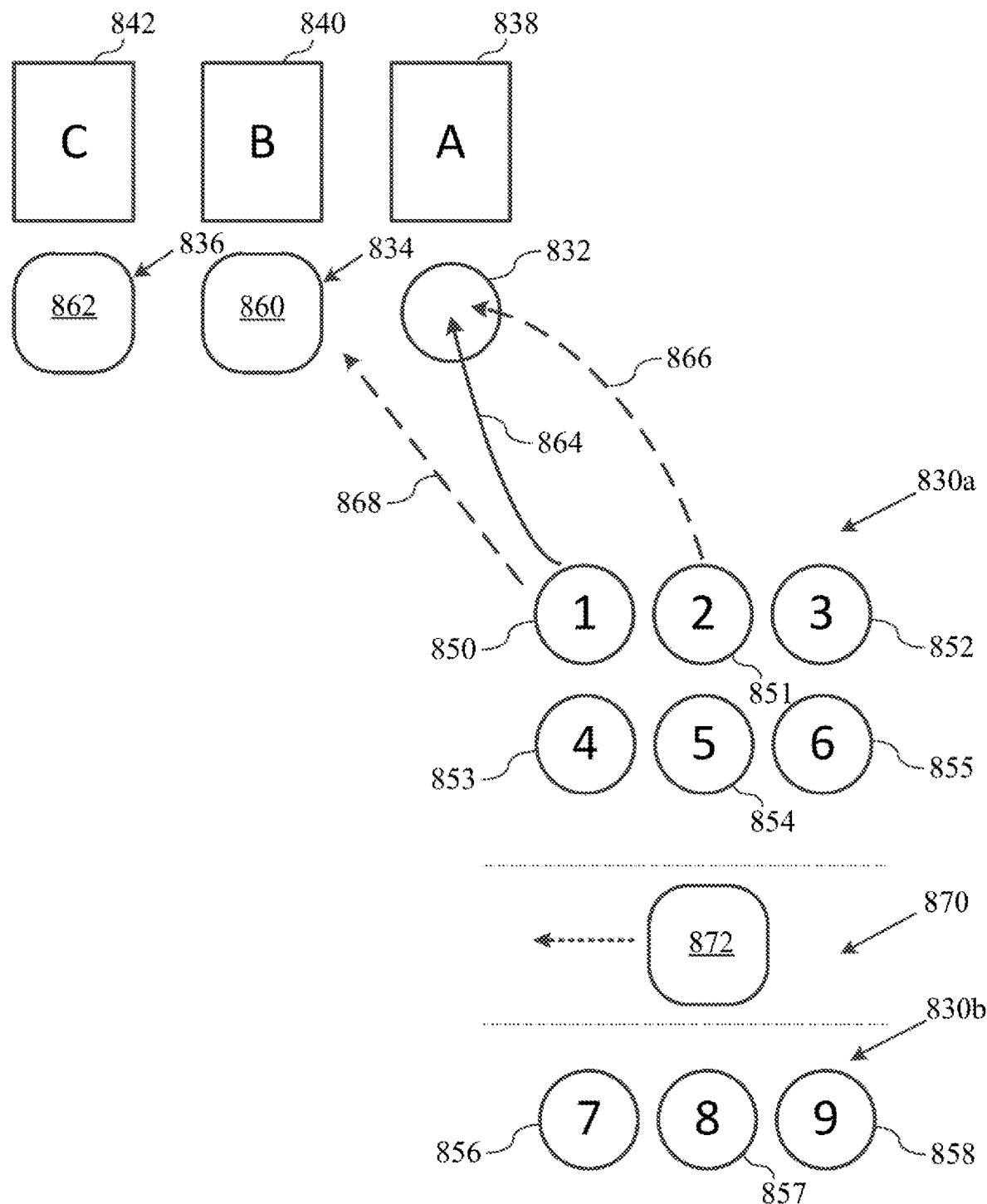
FIG. 13 is a schematic view of the target and queue locations in another aspect of queuing process according to this invention in which both a shared queue and split queue are used.

In yet another embodiment, there is shown in FIG. 13 the shared queue 830 of FIG. 12 divided into a split queue having queue groups 830a and 830b. This shared queue will operate in the same manner as the shared queue 830 of FIG. 12; however, it is split into two queue groups due to the proximity of path 870, which is traversed by operators and robots, such as robot 872. The first queue group 830a has queue locations 850-855 on one side of path 870 and a second queue group 830b has queue locations 856-858 on the opposite side of path 870. The queue locations in the two queue groups 830a and 830b, even though physically separated, together form a single queue for target locations 832, 834, and 836.

Figure 14:
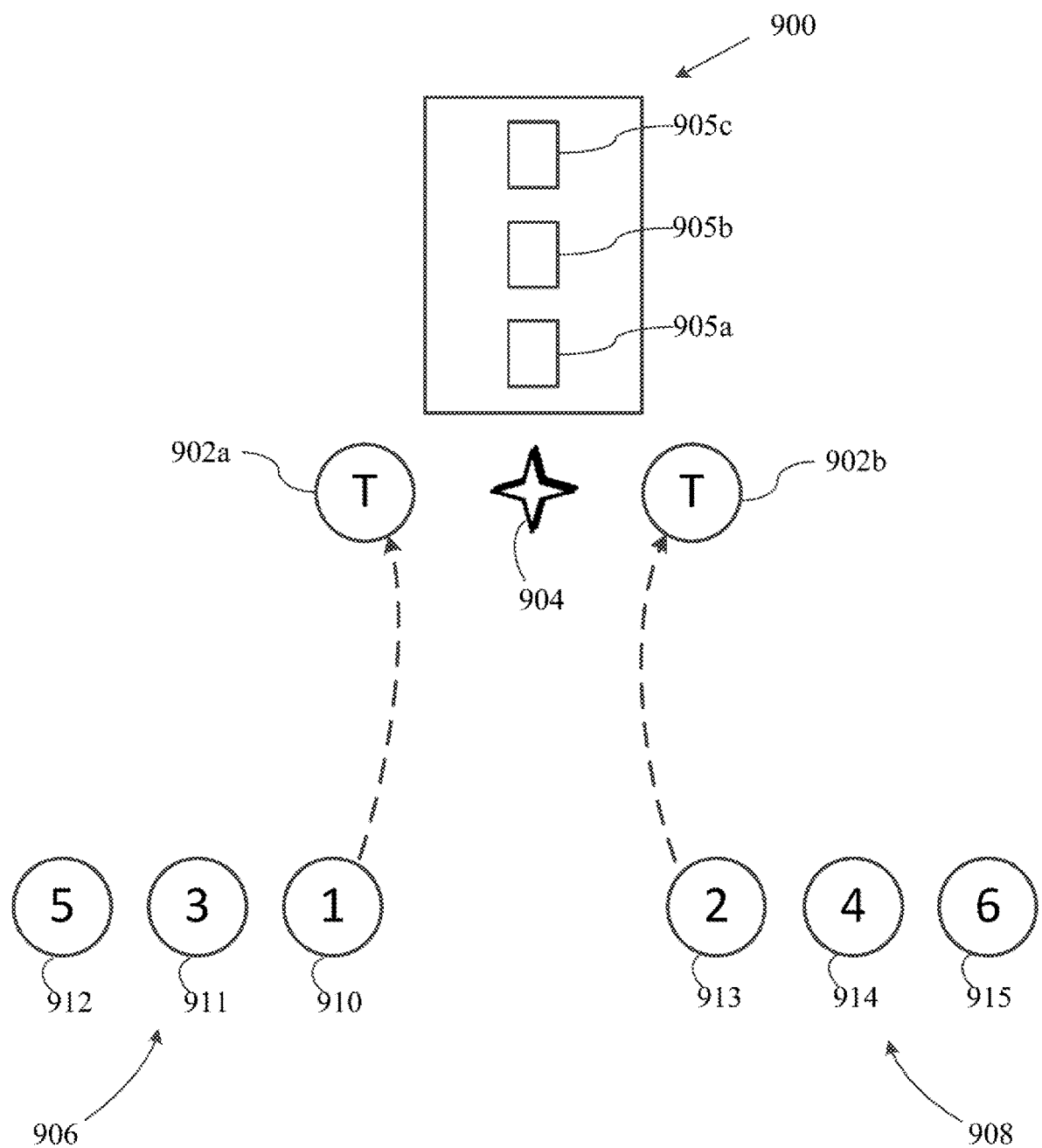
FIG. 14 is a schematic view of another aspect of the queuing process according to this invention in which a split queue is used to feed a processing station having multiple processing positions.

Referring now to FIG. 14, another aspect of the invention using the "split" queue depicted in FIG. 11 is described. In this embodiment, there is a processing station 900, which may be used to process (induct or pack) the robots, which has two target processing locations/positions 902a and 902b, instead of just one target processing location/position 802 as shown in FIG. 11. The processing positions 902a and 902b are each defined by a pose, as described above. With two processing positions at a station, two robots may be brought to the station so that they can be processed together more rapidly by one or more operators, such as operator 904, than if each robot directed to the processing station in series.

Typically, one processing station will be configured to carry out only one function at a time, either induction or packing; however, it is possible to carry out both functions at a single station. Depicted at station 900 are several totes/tote arrays 905a-905c, which the operator may select and use to induct robots being assigned pick orders. One process of inducting robots which may be implemented is described in U.S. patent application Ser. No. 15/254,321, entitled Item Storage Array for Mobile Base in Robot Assisted Order-Fulfillment Operations, filed on Sep. 1, 2016, and incorporated herein by reference in its entirety. Alternatively, when a robot is arriving with a tote/tote array containing items from one or more orders which have already been picked, operator 904 will unload the tote/tote array for packing and shipping of the orders.

Moreover, while processing station 900 is shown to include two processing positions, it is possible to configure station 900 to have additional stations. As described below in more detail, with multiple robots being directed in a coordinated manner from a queue to a single processing station, such as station 900, the robots can be more rapidly processed by operator 904. The result is less robot downtime and hence increased productivity and throughput for the overall order fulfillment warehouse.

In this embodiment, the queue is formed as a split queue having two queue groups; namely, queue groups 906 and 908. Robots arriving at a predetermined target zone proximate the poses for processing positions 902a and 902b will be guided into either queue group 906 or 908 if the processing position is occupied or there are other robots in the queue. If no other robot is in the target processing position and no robots are in the queue groups, the robot may proceed directly to the target processing position.

Queue group 906 may be located more closely to processing position 902a and queue group 908 may be located more closely to processing position 902b so that the robots that are queued in queue group 906 may be more readily directed to processing position 902a and the robots that are queued in queue group 908 may be more readily directed to processing position 902b.

While the robots may be placed in the queue groups and directed out of the queue groups to the processing positions in any desired manner a preferred approach is depicted in FIG. 14. Queue location 910 in queue group 906 is shown to have a priority "1" which is the highest priority. In Queue group 908, queue location 913 is assigned priority "2" which is the next highest priority. The priority assignments alternate between queue groups, with priority "3" being in queue location 911 adjacent to queue location 910 in queue group 906 and priority "4" being in queue group 908 at queue location 914 adjacent to queue location 913. Finally, priority "5" is located at queue location 912 adjacent queue location 911 in queue group 906 and priority "6" is located at queue location 915 adjacent queue location 914 in queue group 908.

When robots destined for processing station 900 arrive in a predetermined target zone proximate processing station 900 they are placed into the queue groups 906 and 908 in an alternating manner based on priority starting with the highest priority robot being assigned to the queue location 910 of queue group queue group 906 and the next highest priority robot being queued at queue location 913 of queue group 908 and so on. When the processing positions 902a and 902b of processing station 900 are open/available, the robots queued at queue locations 910 and 913 are directed, respectively, to processing locations 902a and 902b. Robots located at queue locations 911 and 914 may then be directed to move up in priority to queue locations 910 and 913, respectively. Similarly, Robots located at queue locations 912 and 915 may then be directed to move up in priority to queue locations 911 and 914, respectively, leaving room in the queue for new robots entering the predetermined target zone to be queued. Of course, the queue may contain additional queue locations if a greater volume of robots is expected to be entering the queue at any given time. Additionally, it is possible to dynamically adjust the queue size over time based on machine learning.

Figure 15:
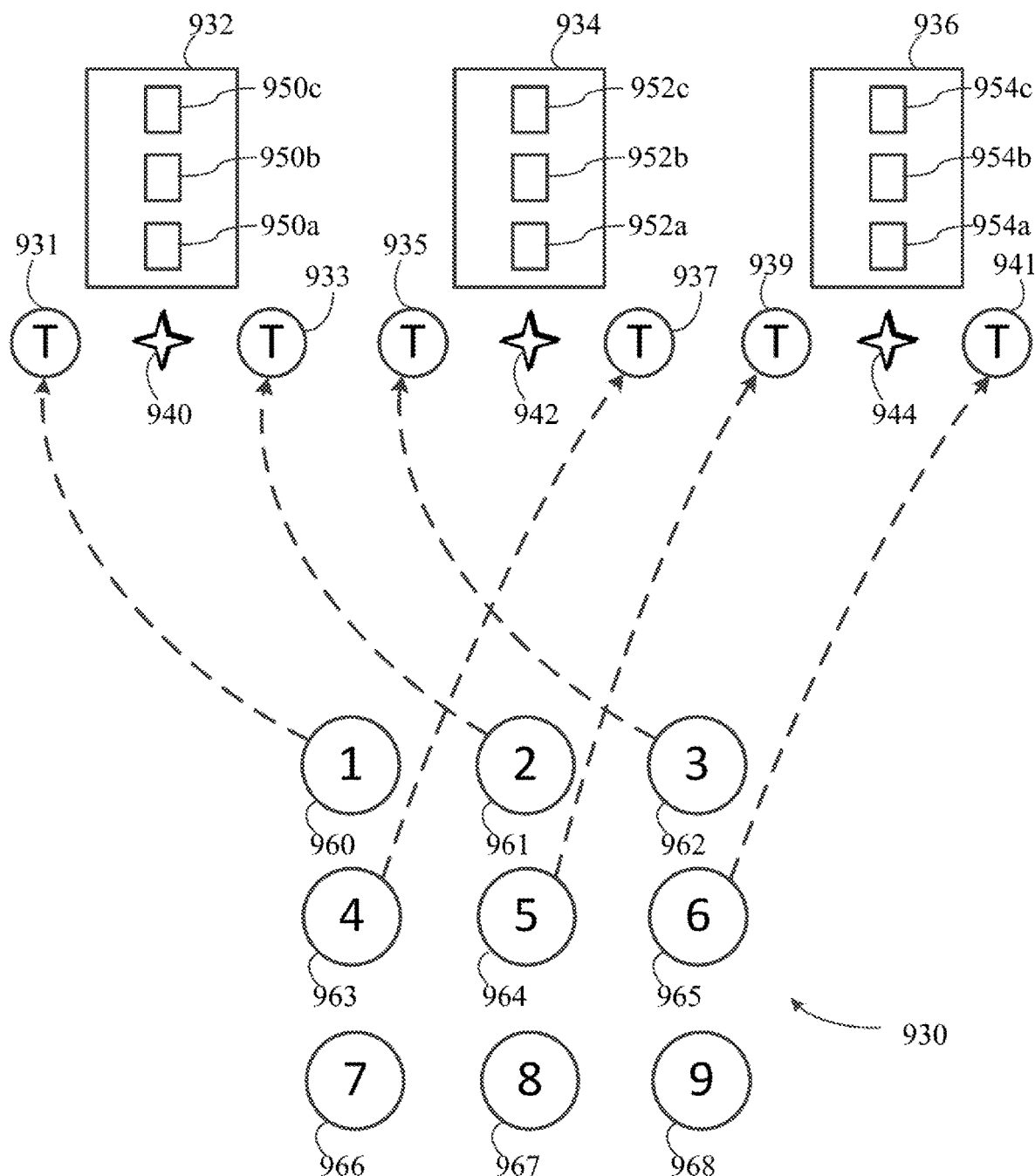
FIG. 15 is a schematic view of another aspect of the queuing process according to this invention in which a shared queue is used to feed multiple processing stations each having multiple processing positions.

In another embodiment, shown in FIG. 15, a "shared" queue 930 may be used. As with the queue in FIG. 12, what is meant by "shared" in this context is that queue group 930 is shared among a number of processing stations, such as processing stations 932, 934, and 936, each having two processing positions at which robots will be located for operators to process. At processing station 932 there are processing positions 931 and 933 which are processed by operator 940. At processing station 934 there are processing positions 935 and 937 which are processed by operator 942. And, at processing station 936 there are processing positions 939 and 941 which are processed by operator 944.

As with the embodiment of FIG. 14, in this embodiment, one station will typically be configured to carry out only one function at a time, either induction or packing; however, it is possible to carry out both functions at a single station. Depicted at station 932, 934, and 936 are several totes/tote arrays at each station; namely, totes/tote arrays 950a-905c, 952a-c, and 954a-c, respectively, which the operators will select and use to induct robots being assigned pick orders.

Robots that are destined for any of processing stations 932, 934, or 936 which have entered the predetermined target zone are directed to one of the queue locations 960-968, which have assigned priorities 1-9, respectively. This means that queue location 960 (priority "1") is the location where the robot with the highest priority would be located irrespective of the processing station for which it is destined and queue location 9 (priority "9") is the queue location where the robot with the lowest priority would be directed. While the robots may be placed in queue 930 and directed out of the queue 930 to the processing positions in any desired manner a preferred approach is depicted in FIG. 15.

As robots enter the predetermined target zone they are placed in queue 930 in the appropriate queue location 960-968 based on priority (1-9). Of course, the queue may contain additional queue locations if a greater volume of robots are expected to be entering the queue at any given time. Additionally, it is possible to dynamically adjust the queue size over time based on machine learning.

When the processing positions of each processing station 932 934, 936 are open/available, the robots queued in queue 930 may be directed to the appropriate processing positions. For example, when processing positions 931 and 933 of processing station 932 are open, the two highest priority robots located at queue locations 960, 961 may be, respectively, directed thereto. When processing positions 935 and 937 of processing station 934 are open, the next two highest priority robots which are located at queue locations 962, 963 may be, respectively, directed thereto. Similarly, robots located at queue locations 964 and 965 may then be directed to move processing positions 939 and 941 (when open/available) of processing station 936. As robots are moved from queue locations to processing positions, the robots remaining in queue will be shifted up to higher priority queue locations. In the above described example, robots in queue locations 966, 967, 968 (priorities 7-9) would be shifted up to queue locations 960, 961, 962 (priorities 1-3).

Figure 16:
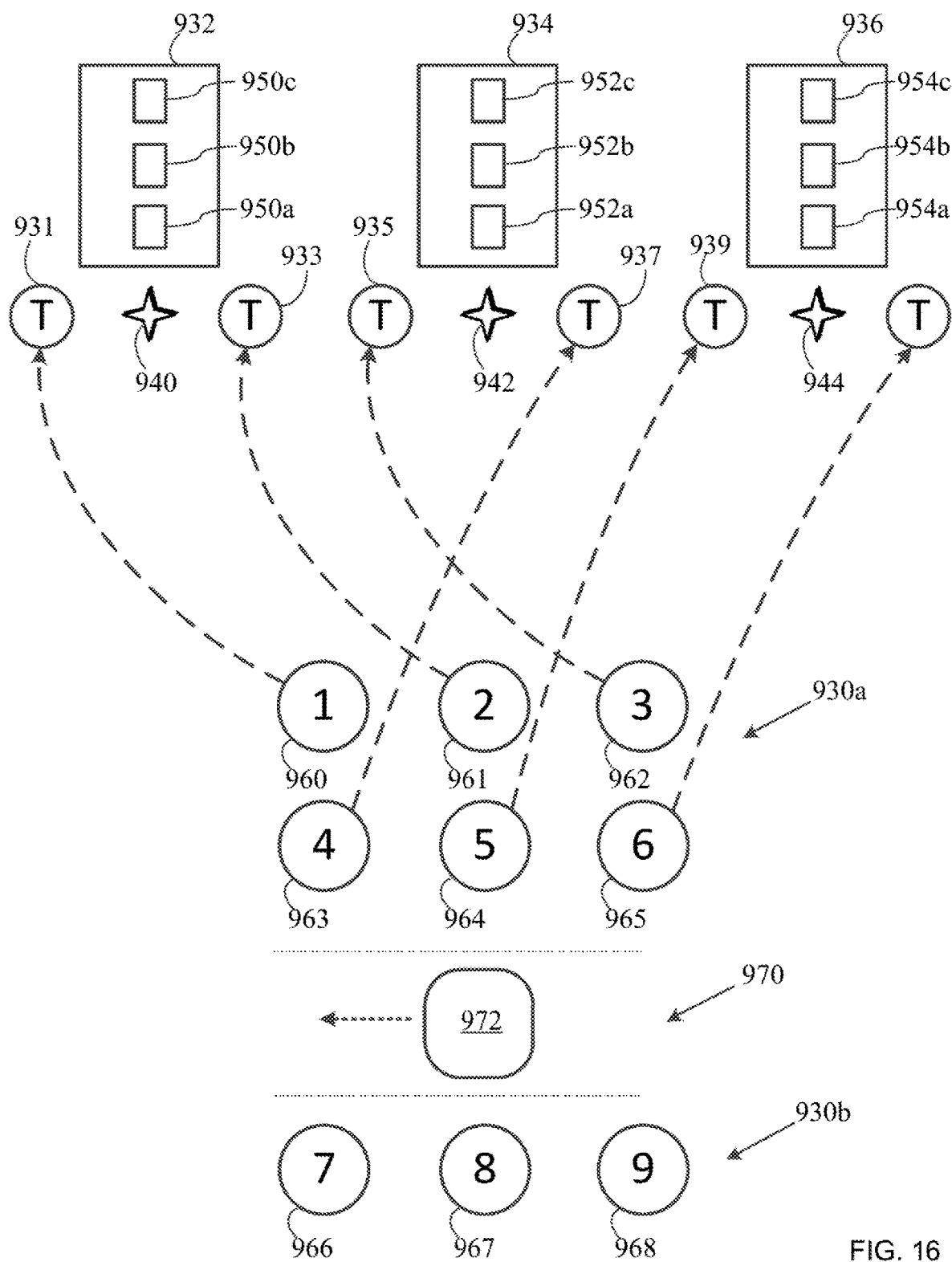
FIG. 16 is a schematic view of another aspect of the queuing process according to this invention in which the shared queue according to FIG. 15 is split and is used to feed a multiple processing station each having multiple processing positions.

In yet another embodiment, there is shown in FIG. 16 the shared queue 930 of FIG. 15, however, in this example it is divided into a split queue having two queue groups 930a and 930b. This shared queue will operate in the same manner as the shared queue 930 of FIG. 15; however, it is split into two queue groups due to the proximity of path 970, which is traversed by operators and robots, such as robot 972. The first queue group 930a has queue locations 960-965 on one side of path 970 and a second queue group 930b has queue locations 966-968 on the opposite side of path 970. The queue locations in the two queue groups 930a and 930b, even though physically separated, together form a single queue for processing stations 932, 934, and 936. The robots are directed from the queue groups 930a and 930b to the processing station 932, 934, and 936 in the manner described above with regard to FIG. 15.

Figure 17:
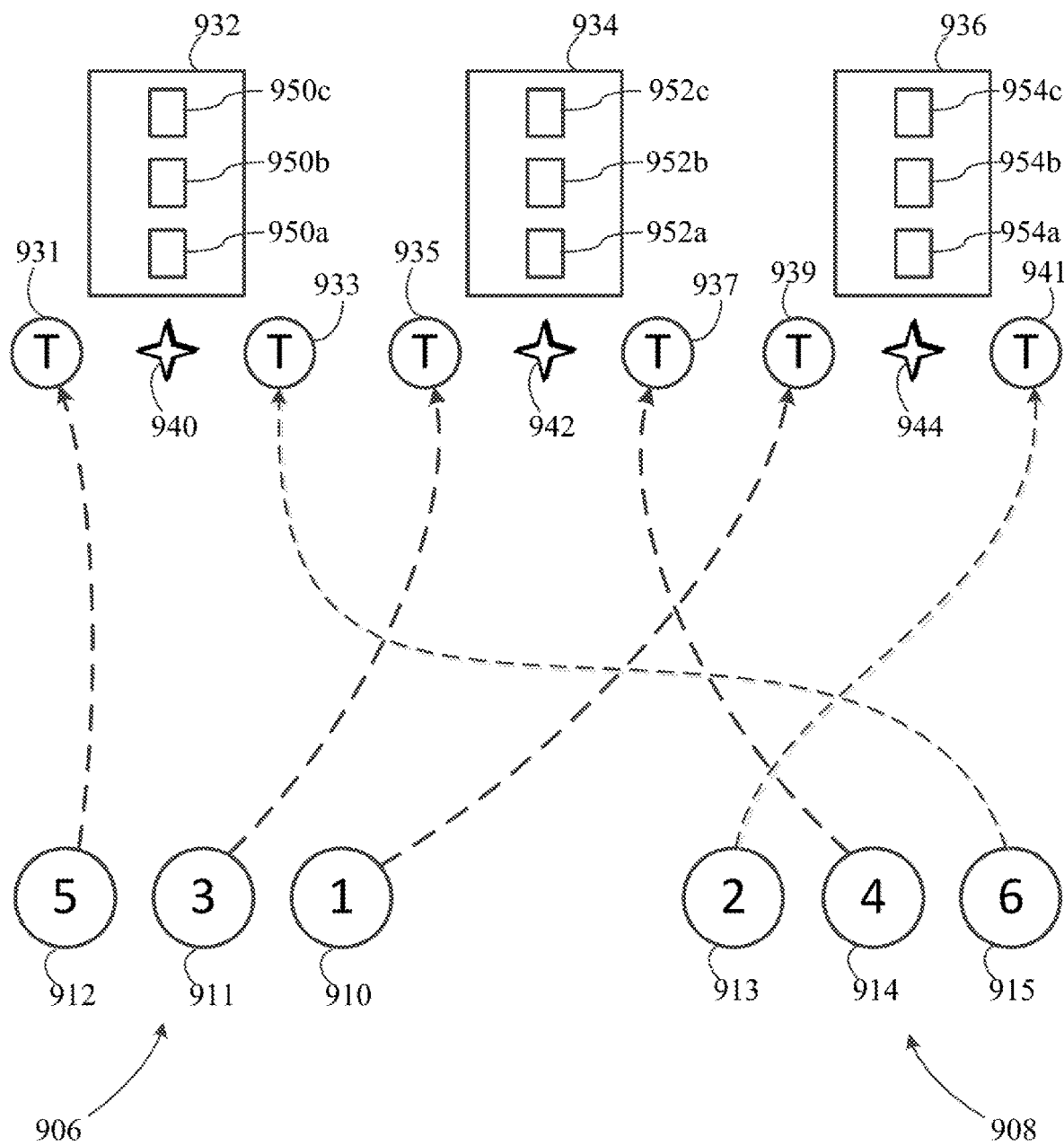
FIG. 17 is a schematic view of another aspect of the queuing process according to this invention in which the split queue according to FIG. 14 is split and is used to feed a multiple processing stations each having multiple processing positions.

Referring now to FIG. 17, there is shown the split queue of FIG. 14 having two queue groups; namely, queue groups 906 and 908. However, in this example, the queue is also operated as a "shared" queue, i.e. it is shared among a number of processing stations, such as processing stations 932, 934, and 936, each having two processing positions at which robots will be located for operators to process. Robots arriving at a predetermined target zone proximate the processing stations they will be guided into either queue group 906 or 908. As described above with regard to FIG. 14, queue location 910 in queue group 906 is shown to have a priority "1", which is the highest priority. In queue group 908, queue location 913 is assigned priority "2" which is the next highest priority. The priority assignments alternate between queue groups, with priority "3" being in queue location 911 adjacent to queue location 910 in queue group 906 and priority "4" being in queue group 908 at queue location 914 adjacent to queue location 913. Finally, priority "5" is located at queue location 912 adjacent queue location 911 in queue group 906 and priority "6" is located at queue location 915 adjacent queue location 914 in queue group 908.

As with the embodiments of FIGS. 15 and 16, when the processing positions of each processing station 932 934, 936 in FIG. 17 are open/available, the robots queued in queue groups 906 and 908 may be directed to the appropriate processing positions. For example, when processing positions 931 and 933 of processing station 932 are open, the two highest priority robots, i.e. those located at queue locations 910 and 913 may be, respectively, directed thereto. As the processing positions at the other processing stations open up, the queued robots are directed in pairs in priority order from the queue to the open positions. As with the other queue configurations, as queue locations become available new robots from lower priority locations in the queue are shifted to the open/higher priority queue locations.

Of course, the examples depicted in FIGS. 15-17 are fairly simple examples of how the invention may be implemented to direct pairs of robots from queue locations to open processing positions at a common processing station. Those skilled in the art will appreciate that the processing positions will not always become open or available in such an orderly fashion. In other words, each pair of processing positions at a processing station may not become available at the same time and robots located adjacent to each other (i.e. in priority sequence) in the queue need not be directed together (in parallel) to a processing station. The invention may be configured to operate in a more dynamic way such that as individual processing positions open up at different processing stations, the robots may be directed individually, in priority order, from the queue to the next available processing position regardless of the processing station. It should be noted that the type of processing required for each robot must be considered when robots from the queue to the next available processing position to ensure the processing station has the required processing capability.

For example, a robot may need to be inducted to execute one or more pick orders but the next available processing position may be located at a station that is configured to only perform unloading/packing. In this case, such robot may be by-passed in favor of a robot in a lower priority queue location because it is the highest priority robot that needs to be unloaded/packed.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

We claim:

1. A method for queuing robots destined for one or more processing stations in an environment, the method comprising:
    establishing a predefined target zone proximate the one or more processing stations;
    determining when each robot of a plurality of robots destined for the one or more processing stations has entered the predefined target zone proximate the one or more processing stations;
    assigning each of the robots to one of a plurality of queue positions based on an assigned priority; and
    directing each of the robots from its assigned queue position to a processing position of one of the processing stations; wherein each of the processing stations includes at least two processing positions for a like number of robots to occupy for processing by an operator;
    wherein the assigned priority is determined by both the order of entry of each of the plurality of robots into the target zone and an order priority associated with a customer order to be processed by each of the plurality of robots.

2. The method of claim 1 wherein the environment is a warehouse space containing items for customer order fulfillment.

3. The method of claim 1 wherein the order priority associated with the customer order to be processed by each of the plurality of robots is determined by one or more of the following: shipping priority, item type, customer type, or retailer.

4. The method of claim 1 wherein the at least two processing positions of the one or more processing stations and the plurality of queue positions are each defined by a pose to which the robot is capable of navigating.

5. The method of claim 1 wherein the one or more processing stations are each configured for one of (a) inducting robots, (b) unloading robots, and (c) both inducting and unloading robots.

6. The method of claim 1 wherein the plurality of queue positions are grouped into one queue group and the plurality of queue positions are associated with a plurality of processing stations.

7. The method of claim 6 wherein the robots from the one queue group are directed in priority order to a next available processing position from any of the plurality of processing stations.

8. The method of claim 1 wherein the plurality of queue positions include at least two queue groups spaced from each other in the environment.

9. The method of claim 8 wherein the first plurality of queue positions in the first queue group and the second plurality of queue positions in the second queue group are associated with a plurality of processing stations.

10. The method of claim 9 wherein the robots from the first and second queue groups are directed in priority order to a next available processing position from any of the plurality of processing stations.

11. The method of claim 8 including a first plurality of queue positions in a first queue group and a second plurality of queue positions in a second queue group, wherein the first plurality of queue positions in the first queue group and the second plurality of queue positions in a second queue group are all associated with one processing station.

12. The method of claim 11 wherein the one processing station includes a first processing position and a second processing position.

13. The method of claim 12 wherein robots from the first queue group are directed to the first processing position and robots from the second queue group are directed to the second processing position.

14. The method of claim 13 wherein robots which have entered the target zone destined for the one processing station are each assigned a priority and are directed to one of the first queue group or the second queue group in an alternating manner based on priority starting with the highest priority robot being assigned to the first queue group.

15. The method of claim 14 wherein robots from the first queue group are directed to the first processing position in sequence based on priority and robots from the second queue group are directed to the second processing position in sequence based on priority.

16. A system for queuing robots destined for at least one processing station in an environment, the system comprising:
    a plurality of robots;
    at least one processing station configured for processing the plurality of robots; wherein each of the at least one processing station includes at least two processing positions for a like number of robots to occupy for processing by an operator; and a management system in communication with the plurality of robots and the at least one processing station, the management system configured to:
establish a predefined target zone proximate the one or more processing station,
determine when each robot of a plurality of robots destined for the at least one processing station has entered a predefined target zone proximate the at least one processing station,
assign each of the robots to one of a plurality of queue positions based on an assigned priority,
direct each of the robots from its assigned queue position to a processing position of one of the at least one processing stations; and
wherein the assigned priority is determined by both the order of entry of each of the plurality of robots into the target zone and an order priority associated with a customer order to be processed by each of the plurality of robots.

17. The system of claim 16 wherein the environment is a warehouse space containing items for customer order fulfillment.

18. The system of claim 16 wherein the order priority associated with the customer order to be processed by each of the plurality of robots is determined by one or more of the following: shipping priority, item type, customer type, or retailer.

19. The system of claim 16 wherein the at least two processing positions of the one or more processing stations and the plurality of queue positions are each defined by a pose to which the robot is capable of navigating.

20. The system of claim 16 wherein the one or more processing stations are each configured for one of (a) induction, (b) packing, and (c) both induction and packing.

21. The system of claim 16 wherein the plurality of queue positions are grouped into one queue group and the plurality of queue positions are associated with a plurality of processing stations.

22. The system of claim 21 wherein the robots from the one queue group are directed in priority order to a next available processing position from any of the plurality of processing stations.

23. The system of claim 16 wherein the plurality of queue positions include at least two queue groups spaced from each other in the environment.

24. The system of claim 23 wherein the first plurality of queue positions in the first queue group and the second plurality of queue positions in the second queue group are associated with a plurality of processing stations.

25. The system of claim 24 wherein the robots from the first and second queue groups are directed in priority order to a next available processing position from any of the plurality of processing stations.

26. The system of claim 23 including a first plurality of queue positions in a first queue group and a second plurality of queue positions in a second queue group, wherein the first plurality of queue positions in the first queue group and the second plurality of queue positions in a second queue group are all associated with one processing station.

27. The system of claim 26 wherein the one processing station includes a first processing position and a second processing position.

28. The system of claim 27 wherein robots from the first queue group are directed to the first processing position and robots from the second queue group are directed to the second processing position.

29. The system of claim 28 wherein robots which have entered the target zone destined for the one processing station are each assigned a priority and are directed to one of the first queue group or the second queue group in an alternating manner based on priority starting with the highest priority robot being assigned to the first queue group.

30. The system of claim 29 wherein robots from the first queue group are directed to the first processing position in sequence based on priority and robots from the second queue group are directed to the second processing position in sequence based on priority.

* * * * *